Figure 1:
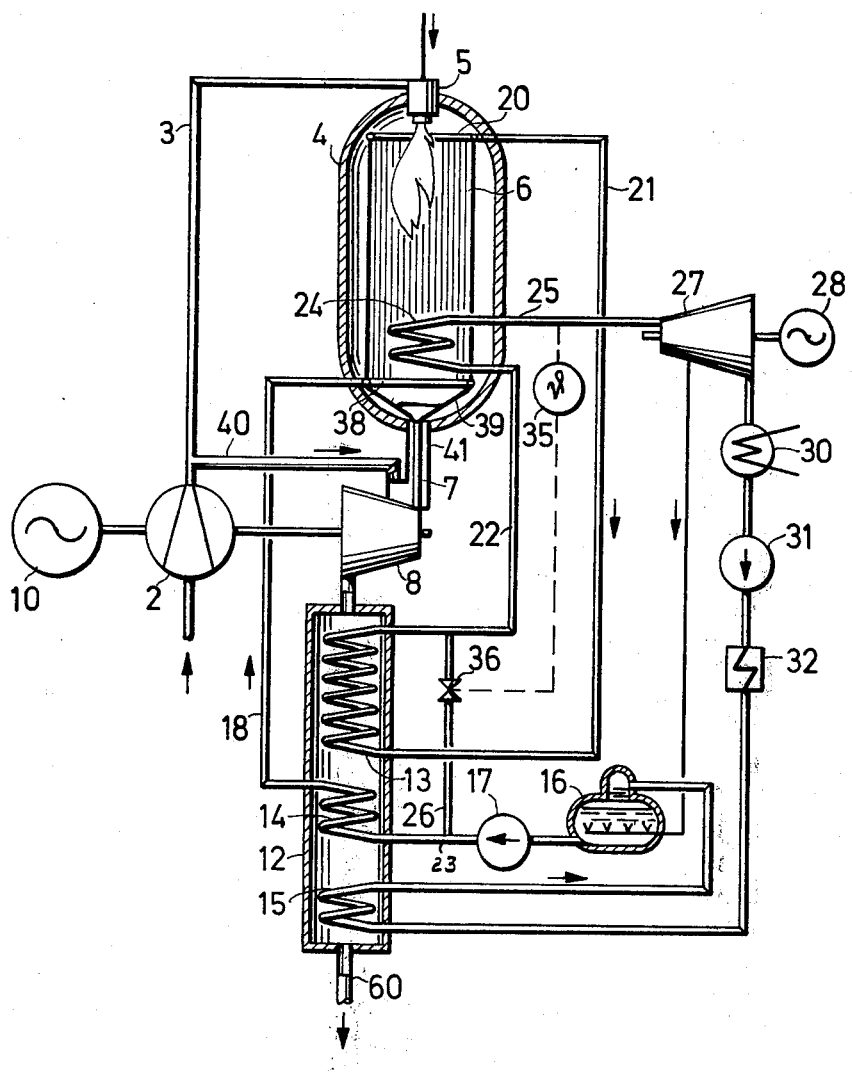

United States Patent [19]
Aguet

[11] 3,969,891
[45] July 20, 1976

[54] COMBINED GAS TURBINE AND STEAM POWDER PLANT

[75] Inventor: Emile Aguet, Winterthur, Switzerland

[73] Assignee: Sulzer Brothers Limited, Winterthur, Switzerland

[22] Filed: July 25, 1974

[21] Appl. No.: 491,631

[30] Foreign Application Priority Data
Jan. 10, 1974    Switzerland.......................... 269/74

[52] U.S. Cl............................................. 60/39.18 B
[51] Int. Cl.² ..................... F01K 23/06; F02C 7/02
[58] Field of Search..... 60/39.18, 39.18 R, 39.18 A, 60/39.18 B

[56] References Cited
UNITED STATES PATENTS

| | | |
|---|---|---|
| 3,007,306 | 11/1961 | Martin et al. .................. 60/39.18 R |
| 3,105,661 | 10/1963 | Ferri .......................... 60/39.18 R X |
| 3,204,407 | 9/1965 | Meissenberg et al. ......... 60/39.18 R |
| 3,461,667 | 8/1969 | Aquet ....................... 60/39.18 R X |

*Primary Examiner*—Martin P. Schwadron
*Assistant Examiner*—H. Burks, Sr.
*Attorney, Agent, or Firm*—Kenyon & Kenyon Reilly Carr & Chapin

[57] ABSTRACT

A substantial part of the superheating surface is shifted out of the pressure vessel and into the flow of exhaust gases from the gas turbine in order to reduce the size of the pressure vessel. The superheating surface outside the pressure vessel is located in the same housing as the feedwater preheating surfaces and can be bypassed by a suitable by-pass line. A supplementary burner can also be positioned in the gas turbine exhaust flow upstream of the displaced superheating surface.

5 Claims, 2 Drawing Figures

COMBINED GAS TURBINE AND STEAM POWDER PLANT

This invention relates to a combined gas turbine and steam power plant.

Combined gas turbine and steam power plants have been known in which a gas turbine is connected on an input side to the exhaust of a pressure vessel and the pressure vessel constructed with evaporator and superheating surfaces. Generally, these plants have a drawback that beyond a certain plant performance, the pressure vessel becomes so large as to preclude fabrication in a workshop and subsequent transport, as a unit, to the plant site. Further, the assembly of the pressure vessel at the plant site should be avoided as far as possible because the working conditions at the plant site are usually more unfavorable than in the workshop.

Accordingly, it is an object of the invention to permit the fabrication of a pressure vessel for a combined gas turbine and steam power plant in a workshop.

It is another object of the invention to increase the peak performance of a combined gas turbine and steam power plant.

It is another object of the invention to reduce the size of a pressure vessel for a combined gas turbine and steam power plant.

It is another object of the invention to provide a pressure vessel which can be relatively easily transported to a plant site for a combined gas turbine and steam power plant.

Briefly, the invention provides a combined gas turbine and steam power plant which includes a pressure vessel having an evaporator and a superheating surface therein, a gas turbine connected to the pressure vessel to receive a flow of combustion gases from the vessel and a second superheating surface outside the pressure vessel and in a flow of exhaust gases from the gas turbine. This latter superheating surface is connected in line between the evaporator and the superheating surface in the pressure vessel relative to a flow of working medium passing through the respective surfaces.

The plant also includes an air compressor which is connected to the pressure vessel to deliver compressed air to the vessel and one or more feed water preheating surfaces for conducting a flow of feedwater in heat exchange relation with the flow of exhaust gas from the gas turbine prior to delivery to the evaporator. The preheating surfaces can be encased within a suitable housing along with the external superheating surface where the housing is connected to an outlet of the gas turbine to receive the flow of turbine exhaust gases.

By locating a substantial part of the entire superheating surface outside the pressure vessel and in the flow of exhaust gases from the gas turbine, the pressure vessel can be made in a size which can be readily transported. Even though this displaced part of the entire superheating surface is considerably larger than if housed in the pressure vessel, the increase is counterbalanced by the fact that the pressure vessel is smaller and lighter relative to the plant performance. Further, by locating a superheating surface in the flow of exhaust gases, the performance of the gas turbine is, surprisingly, increased and efficiency improved because the gas turbine can be operated by a higher gas temperature and a higher air excess ($\lambda = 1.5 \ldots 2$). Such a high air excess is quite unusual for a combined plant of this kind. In addition, there is a constructional advantage. That is, water injection can be provided between the two superheating surfaces in order to regulate the temperature of the live steam without having to provide additional inlet openings in the pressure vessel.

The above arrangement of the superheating surfaces can also be used in combined plants where the output is less than the above mentioned peak performance. In this case, the pressure vessel can advantageously be made smaller and lighter.

Figure 2:
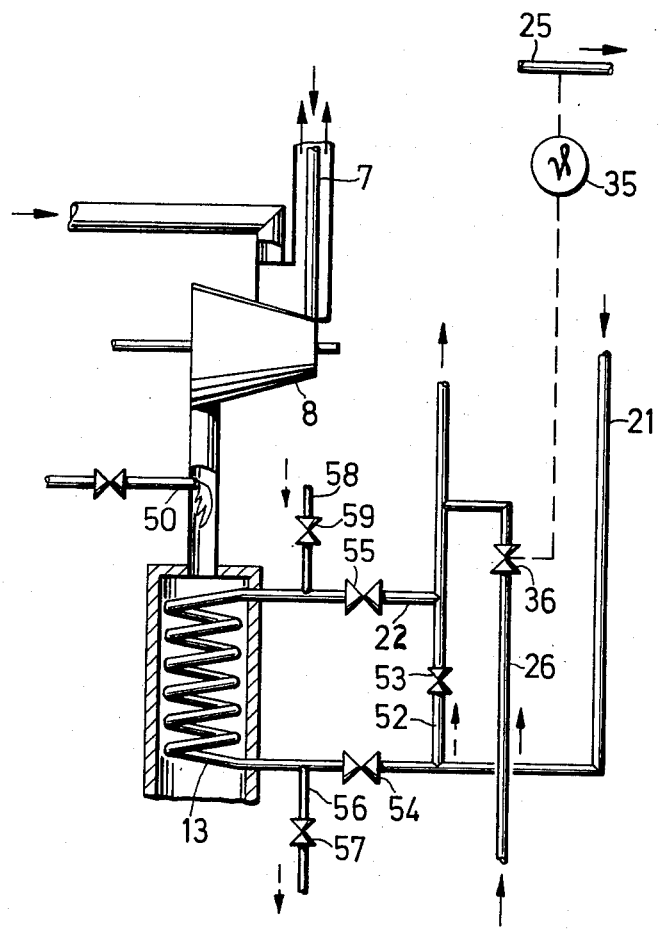

These and other objects and advantages of the invention will become more apparent from the following detailed description and appended claims taken in conjunction with the accompanying drawings in which:

FIG. 1 illustrates a schematic view of a combination plant in accordance with the invention; and FIG. 2 illustrates a modified part of a plant according to FIG. 1.

Referring to FIG. 1, the plant has an air-compressor 2 which is connected through a compressed-air line 3 with a burner 5 disposed at the upper end of a cylindrical pressure-vessel 4 in order to deliver compressed air to the pressure-vessel 4. The pressure-vessel 4 is provided with an evaporating surface or evaporator 6 and a superheating surface 24. The evaporating surface 6 is in the form of a gas tight tubular wall extending coaxially in the pressure-vessel 4 to define a combustion chamber and to protect the vessel 4 against flame radiation. Inside the tubular wall the evaporating tubes run in straight lines between a lower distributor 38 and an upper collector 20. The superheating surface 24 is disposed, as a group of tubes, in the lower section of the space delimited by the evaporating surface 6. The upper section of this space forms the combustion chamber common to the steam generator and the gas turbine, and may be made round or cornered in cross section.

A sheet metal funnel 39 is connected below and to the lower distributor 38 of the evaporating heating surface 6 and merges into gas line 7 which runs to an inlet of a gas turbine 8. The line 7 serves to deliver a flow of combustion gases from the vessel 4 to the gas turbine 8. The gas turbine 8 and the air-compressor 2 are set on a common shaft coupled to an electric generator 10.

An outlet from the gas turbine 8 is connected to a housing 12 in which (relative to the direction of the flow of the exhaust gas) are disposed a superheating surface 13, a high-pressure feed water preheater 14, and a low-pressure feed-water preheater 15. The housing 12 is, in turn, connected to an exhaust-gas line 60 which runs to a chimney (not shown).

The plant also comprises a steam-turbine 27, which drives an electric generator 28. The steam turbine 27 is connected at an input side, by a live-steam line 25, with the superheating surface 24 disposed in the pressure-vessel 4. The output side of the steam turbine 27 is connected to a condenser 30 which, through the intermediary of a condensate pump 31 and a steam-heated preheater 32, connects with the low-pressure preheater 15 set in the flow of exhaust gas from the gas turbine 8. This preheater 15 is connected with a feed-water tank 16, which through a feed-pump 17 is connected with the high-pressure preheater 14 set in the flow of exhaust gas. This preheater 14 is, via a line 18, connected to the distributor 38 of the evaporating heating surface 6, while the collector 20 is connected over a line 21 with the superheating surface 13 set in the flow of exhaust gas from the gas turbine 8. A water separator (not shown) may also be installed in the line 21. A line 22 connects the superheater surface 13 with the superheater surface 24.

A temperature sensor 35 is provided in the live-steam line 25 which, through the intermediary of a regulator (not shown), influences a water-injection valve 36 disposed in a line 26 which is branched off beyond the feed-pump 17 upstream of the preheater 14 at 23 to empty into the connecting line 22.

The gas line 7 leading to the input into the gas turbine 8 is surrounded by a conduit 41, which is connected to the compressed-air line 3 via a branch line 40. The line 41 is thus flowed through by a part of the compressed air produced by the air compressor 2, which then flows through the space between the pressure-vessel 4 and the tubular wall of the evaporating surface 6. After this, the air is deflected 180° in the region of the burner 5 and passes into the space delimited by the tubular wall of the evaporating surface 6. This air then mixes with the combustion gases in the combustion chamber and flows out the line 7. In flowing through the line 41 and the space between the pressure-vessel 4 and the tubular wall of the evaporator 6, the air cools the exhaust-gas line 7 and the wall of the pressure-vessel 4.

Since the gas line 7 is subject to considerable heat expansion, the line 7 is made in two sections. Since a great air excess is allowed and leakage of cool air from the line 41 into the line 7 can be accepted, the two sections of the line 7 are connected over a labyrinth seal (not shown). Thus, it is not necessary to install the customary gas-tight expansion element in the line 7.

It is also possible to conduct all the compressed air produced by the air-compressor 2 into the line 41 for passage into the pressure-vessel and thence to the burner 5. As compared with such an arrangement, the form of construction shown in the drawing has the advantage that higher air-speeds may be obtained in the line 41 without the total loss of pressure becoming increased. This allows better cooling of the gas line 7.

It is moreover possible to provide bypass openings for the compressed air, for example in the sheet-metal funnel 39, so that a part of the compressed air goes directly into the gas line 7. The bypass openings may on occasion be adjustable in cross-section for regulatory purposes.

When starting up, and when operating with a small part-load, the gas temperature at the outlet from the gas turbine 8 may fall to such an extent that, with the arrangement of FIG. 1, condensation might occur in the superheating surface 13 if the steam generator is not operated with a lower steam pressure, i.e. with sliding pressure, as the load diminishes. In order to avoid such condensation, and as shown by FIG. 2, a supplementary burner 50 is provided between the outlet from the gas turbine 8 and the superheating surface 13. This supplementary burner 50 is put into operation when the exhaust-gas temperature of the turbine 8 falls below a certain predetermined value.

A further possibility for avoiding condensation in the superheater surface 13 consists of bridging over the superheater surface 13 by means of a bypass line 52 having a valve 53 for controlling the flow and by placing valves 54, 55 in the respective lines 21, 22 of the superheating surface 13 to block off the superheating surface 13. This may be provided in addition to or in place of the supplementary burner 50.

As is further shown by FIG. 2, the line 21 between the valve 54 and the superheating surface 13 may be connected to a line 56 having a valve 57 therein for the purpose of removing water from the heating surface 13 after a shut-down of the plant. Furthermore, a line 58 having a valve 59 therein may be connected to the line 22 between the superheating surface 13 and the valve 55 through which the superheating surface 13 may be filled with nitrogen on occasion after a shut-down of the plant.

The valve 53, in the bypass line 52, may also be used to regulate the live-steam temperature by being made subject to the influence of the temperature-senser 35 (this is not shown in FIG. 2). This may be used instead of the injection valve 36, or in addition thereto. In the latter case, an alternate influencing of the valves 36 and 53 may be advantageous.

Referring to FIG. 1, during operation, combustion air and fuel are fed into the pressure vessel 4 to form a flow of combustion gases which flows over the evaporator 6 and superheating surface 24 and then exits via the line 7 into the gas turbine 8 to drive the turbine 8. The resultant exhaust gases from the turbine 8 pass into the housing 12 and flow over the superheating surface 13 and preheater surfaces 14, 15 before exiting via the line 60 to the chimney (not shown). During this time, feedwater is passed through the preheater surfaces 14, 15 in heat exchange relation with the gas turbine exhaust gases. The preheated feedwater flow is then conducted to the evaporator 6 and evaporated while passing in heat exchange relation to the flow of combustion gases in the combustion chamber. The resultant working medium then flows to the external superheating surface 13 for heat exchange with the gas turbine exhaust gases and thence to the internal superheating surface 24 for the production of the live steam. The steam then passes to the steam turbine 27.

What is claimed is:

1. A combined gas turbine and steam power plant comprising
   a pressure vessel;
   an air compressor connected with said pressure vessel to deliver compressed air to said pressure vessel;
   an evaporator within said pressure vessel for receiving and evaporating a flow of working medium;
   a gas turbine connected to an outlet of said pressure vessel to receive a flow of combustion gases therefrom;
   a housing connected to an outlet of said gas turbine to receive a flow of exhaust gases therefrom;
   at least one feedwater preheating surface in said housing for conducting a flow of feedwater in heat exchange relation with said flow of exhaust gases, said preheating surface being connected to said evaporator to deliver the preheated feedwater thereto;
   a first superheating surface disposed in the flow of exhaust gases from said gas turbine outside said pressure vessel and connected to said evaporator to receive the working medium; and
   a second superheating surface inside said pressure vessel connected to said first superheating surface to receive the working medium therefrom.

2. A combined gas turbine and steam power plant as set forth in claim 1 wherein said evaporator is in the form of a gas tight tubular wall disposed coaxially of said pressure vessel to define a combustion chamber therein.

3. A combined gas turbine and steam power plant as set forth in claim 1 which further comprises a supplementary burner between said gas turbine and said first superheating surface in the flow of exhaust gases.

4. A combined gas turbine and steam power plant as set forth in claim 1 which further comprises a bypass line for bridging over said first superheating surface and a valve in said line for controlling flow therethrough.

5. In a combined gas turbine and steam power plant,
a pressure vessel having an evaporator and a first superheating surface therein;
a gas turbine connected to said pressure vessel to receive a flow of combustion gases therefrom; and
a second superheating surface outside said pressure vessel and disposed in a flow of exhaust gases from said gas turbine, said second superheating surface being connected between said evaporator and said first superheating surface relative to a flow of working medium passing therethrough.

* * * * *

UNITED STATES PATENT AND TRADEMARK OFFICE
CERTIFICATE OF CORRECTION

PATENT NO. : 3,969,891
DATED : July 20, 1976
INVENTOR(S) : Emile Aguet

It is certified that error appears in the above–identified patent and that said Letters Patent are hereby corrected as shown below:

In the title and in column 1, line 1, change

"POWDER" to -- Power --.

Signed and Sealed this

Nineteenth Day of October 1976

[SEAL]

Attest:

RUTH C. MASON
*Attesting Officer*

C. MARSHALL DANN
*Commissioner of Patents and Trademarks*